UNITED STATES PATENT OFFICE.

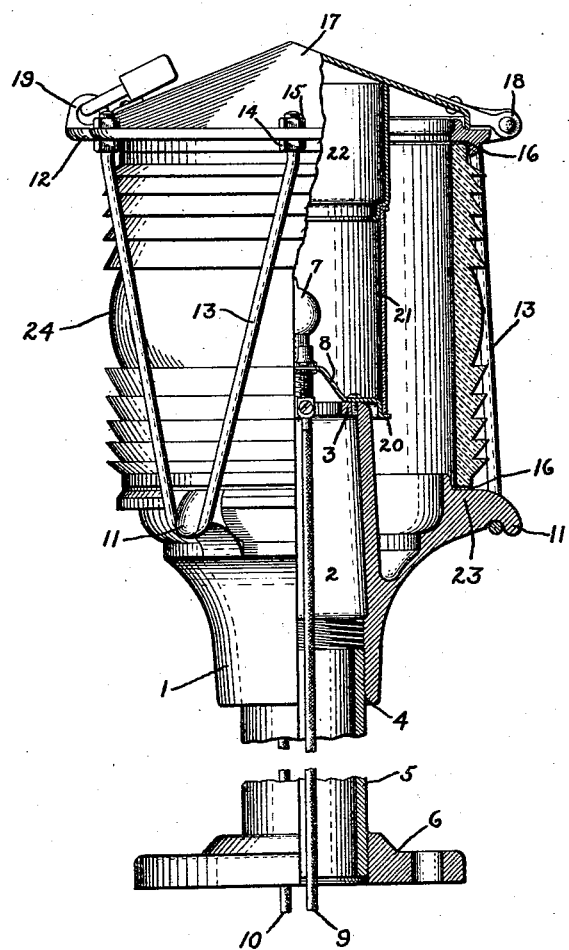

JAMES A. O'NEIL, OF LYNN, MASSACHUSETTS, ASSIGNOR TO GENERAL ELECTRIC COMPANY, A CORPORATION OF NEW YORK.

NAVIGATION LIGHT.

1,415,685.  Specification of Letters Patent.  Patented May 9, 1922.

Application filed April 22, 1921. Serial No. 463,604.

*To all whom it may concern:*

Be it known that I, JAMES A. O'NEIL, a citizen of the United States, residing at Lynn, in the county of Essex, State of Massachusetts, have invented certain new and useful Improvements in Navigation Lights, of which the following is a specification.

My invention has reference to improvements in navigation lights, designed to permit the convenient assembling and ready replacement of the fragile parts of such units.

Units of this character are usually supported on a buoyant member anchored offshore, which member is tossed about by the movement of the water and wind. Heretofore, when a fragile part of the unit was broken, particularly the lens, it has been necessary for the light attendant to remove the whole unit from the buoyant element and take it ashore to his station, which may be a considerable distance away, to make the necessary replacement, which could not be made at the place because of the complicated construction of the unit and the difficulties due to the unstable position of the unit and the lack of working space. The novel and simple arrangement of my invention permits the attendant to disassemble and replace the lens or other parts at the place from his boat.

My invention will be better understood from the following description taken in connection with the accompanying drawing, and its scope will be pointed out in the appended claims.

In the drawing, the figure is an elevation, partly in section, of a navigation light embodying my invention.

Referring to the drawing, the numeral 1 indicates the lamp base. This casing is formed with a tubular member 2 having a flange 3 at one end and internal screw threads 4 at its opposite end.

The base is supported by a pipe 5, screwed into the threads 4 at one end and into a base plate 6 at its opposite end. The plate 6 is suitably secured to and supported by a buoyant member which contains the source of energy for the light. This member may be of any known type and forms no part of my present invention.

The source of light, which I have shown as an incandescent electric lamp 7, is suitably supported on the flange 3 of the base, such as by a member 8 screwed to the flange 3. The lamp is fed by conductors 9 and 10, housed within the pipe 5 and the tubular member 2, and suitably connected to an electrical source. The base 2 is also formed with a circular flange 23 which suitably supports a cylindrical Fresnel lens 24 in proper relation to the light source 7. This flange has a number of ears 11, preferably three, equidistantly spaced. A flanged ring 12 fits over the top of the cylindrical lens 24 and is secured to the casing 2 by means of a number of V-shaped rigid members 13. These V-shaped rigid members are hooked over the ears 11, and their free ends, which are screw threaded, pass through suitable openings in the ring 12 and are secured in this position by nuts 14 and 15. Suitable felt or rubber washers 16 are placed between the lens 24 and flange 23 and ring 12 respectively to make the unit water-proof and to cushion the lens and thereby prevent its breaking when the nut 15 is tightened. It will, therefore, be seen that the lens 24 may be readily removed by simply removing the nuts 15 and taking off the ring 12. Of course, the lens can be replaced with equal facility and ease in a manner readily understood. The unit is closed by a cover 17 hinged to the ring 12 at 18. Any suitable means for locking the cover may be employed, such as a padlock and eye as indicated at 19.

If a colored light is desired, the member 8 is formed with a flange 20, arranged to support a cylindrical color screen 21. This screen is set and held in position by a cylindrical member 22, suitably secured to the cover 17, such as by welding.

While I have described my invention as embodied in concrete form in accordance with the provisions of the patent statutes, it should be understood that I do not limit my invention thereto, since various modifications thereof will suggest themselves to those skilled in the art without departing from the spirit of my invention, the scope of which is set forth in the annexed claims.

What I claim as new and desire to secure by Letters Patent of the United States, is :—

1. An electric lighting unit comprising a tubular base member having an external circular flange formed with ears, an electric lamp supported by said base member, a cylindrical lens mounted on said flange, a ring carrying a hinged cover supported by the lens, and V-shaped members engaging said ears removably secured at their free ends to said ring.

2. An electric lighting unit comprising a tubular base member having an external circular flange formed with ears, an electric lamp supported by said base member, a cylindrical lens mounted on said flange, a ring carrying a hinged cover supported by the lens, and V-shaped members engaging said ears, removably secured at their free ends to said ring, a cylindrical color screen supported on said base, and means carried on said cover for securing the color screen in position.

In witness whereof, I have hereunto set my hand this twentieth day of April, 1921.

JAMES A. O'NEIL.